*(12)* United States Patent
Johnson et al.

(10) Patent No.: US 7,099,355 B1
(45) Date of Patent: Aug. 29, 2006

(54) DISTRIBUTED HIERARCHICAL SCHEDULING AND ARBITRATION FOR BANDWIDTH ALLOCATION

(75) Inventors: Ian David Johnson, Littlehampton (GB); Marek Stephen Piekarski, Macclesfield (GB)

(73) Assignee: Xyratex Technology Limited, Hampshire (GB)

( * ) Notice: Subject to any disclaimer, the term of this patent is extended or adjusted under 35 U.S.C. 154(b) by 0 days.

(21) Appl. No.: 09/869,086

(22) PCT Filed: Dec. 1, 1999

(86) PCT No.: PCT/GB99/04007

§ 371 (c)(1),
(2), (4) Date: Jun. 20, 2001

(87) PCT Pub. No.: WO00/38376

PCT Pub. Date: Jun. 29, 2000

(30) Foreign Application Priority Data

Dec. 22, 1998 (GB) ................................. 9828143.9

(51) Int. Cl.
*H04J 3/04* (2006.01)
*H04L 12/56* (2006.01)
(52) U.S. Cl. ...................................... 370/535; 370/413
(58) Field of Classification Search ........ 370/413–414, 370/412, 542, 535–537
See application file for complete search history.

(56) References Cited

U.S. PATENT DOCUMENTS 5,592,476 A * 1/1997 Calamvokis et al. ........ 370/390
6,349,097 B1 * 2/2002 Smith .......................... 370/390

FOREIGN PATENT DOCUMENTS

WO    9621303    7/1996

OTHER PUBLICATIONS

Wallmeier et al., "Traffic Control in ATM Switches with Large Buffers", vol. SEMINAR 9, 1995, pp. 45-60.
Hui Zhang et al., "Comparison of Rate-Based Service Disciplines", vol. 21, No. 4, Sep. 1991.

* cited by examiner

*Primary Examiner*—Chi Pham
*Assistant Examiner*—Ronald Abelson
(74) *Attorney, Agent, or Firm*—Pillsbury Winthrop Shaw Pittman LLP

(57) ABSTRACT

According to the present invention there is provided a scheduling and arbitration process for use in a digital data switching arrangement of the type in which a central switch under the direction of a master control provides the cross-connections between a number of high-bandwidth ports to which are connected on the ingress side of the central switch a number of ingress multiplexers, one for each high-bandwidth input port and on the egress side a number of egress multiplexers, one for each high-bandwidth output port, each ingress multiplexer including a set of N input queues serving N low-bandwidth data sources and a set of M virtual output queues serving M low-bandwidth output data sources, characterized in that the scheduling and arbitration arrangement includes three bandwidth allocation tables, an ingress port table associated with the input queues and having N×M entries each arranged to define the bandwidth for a particular virtual output queue, an egress port table associated with the virtual output queues and having M entries each arranged to define the bandwidth allocation of a high-bandwidth port of the central switch to a virtual output queue and a central allocation table located in the master control and having $(M \times N)^2$ entries each of which specifies the weights allocated to each possible connection through the central switch.

14 Claims, 7 Drawing Sheets

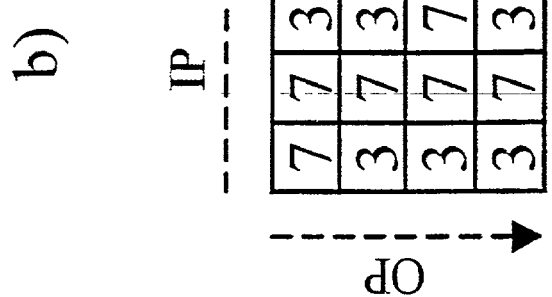
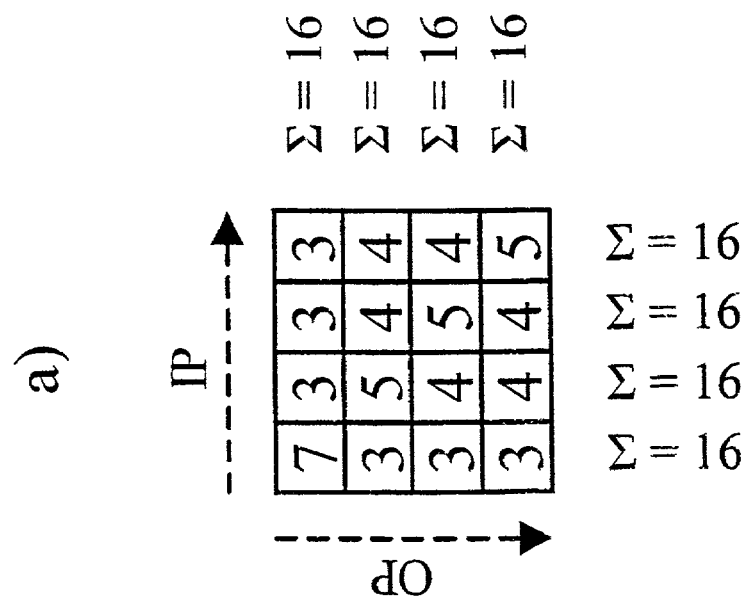
Figure 6

DISTRIBUTED HIERARCHICAL SCHEDULING AND ARBITRATION FOR BANDWIDTH ALLOCATION

BACKGROUND OF THE INVENTION

The present invention relates to data switching systems and is more particularly concerned with the scheduling and arbitration arrangements for such systems.

The continual growth of demand for manageable bandwidth in networks requires the development of new techniques in switch design which decouples the complexity of control from the scale of the port count and aggregate bandwidth. This invention describes a switch architecture and a set of methods which provide the means by which switches of arbitrary size may be constructed whilst maintaining the ability to allocate guaranteed bandwidth to each possible connection through the switch. A digital switch is used to route data streams from a set of source components to a set of destination components. A cell-based switch operates on data which is packetized into streams of equal size cells. In a large switch the routing functions may be implemented hierarchically, that is sets of lower bandwidth ports are aggregated into a smaller number of higher bandwidth ports which are then interconnected in a central switch.

It is an object of the present invention to provide a bandwidth allocation arrangement which may be used in such a hierarchical switch.

SUMMARY OF THE INVENTION

According to the present invention there is provided a scheduling and arbitration process for use in a digital data switching arrangement of the type in which a central switch under the direction of a master control provides the cross-connections between a number of high-bandwidth ports to which are connected on the ingress side of the central switch a number of ingress multiplexers, one for each high-bandwidth input port and on the egress side a number of egress multiplexers, one for each high-bandwidth output port, each ingress multiplexer including a set of N input queues serving N low-bandwidth data sources and a set of M virtual output queues serving M low-bandwidth output data sources, characterized in that the scheduling and arbitration arrangement includes three bandwidth allocation tables, an ingress port table associated with the input queues and having N×M entries each arranged to define the bandwidth for a particular virtual output queue, an egress port table associated with the virtual output queues and having M entries each arranged to define the bandwidth allocation of a high-bandwidth port of the central switch to a virtual output queue and a central allocation table located in the master control and having $(M \times N)^2$ entries each of which specifies the weights allocated to each possible connection through the central switch.

According to a feature of the invention there is provided a scheduling and arbitration process in which the scheduling of the input queues is performed in accordance with an N-way weighted round robin.

According to a further feature of the invention there is provided an implementation of the N-way weighted round robin by an $N.(2^w-1)$-way unweighted round robin where u, is the number of bits defining a weight using a list constructed by interleaving N words of $(2^w-1)$ bits each, with $w_n$ 1's in a word, where $w_n$ is the weight of the queue n.

BRIEF DESCRIPTION OF THE DRAWING

The invention, together with its various features, will be more readily understood from the following description of one embodiment, which should be read in conjunction with the accompanying drawings. In the drawings:

FIG. 6 shows the allocations for a 4-port interconnect with 3 bit weights; and

DETAILED DESCRIPTION OF THE INVENTION

Figure 1:
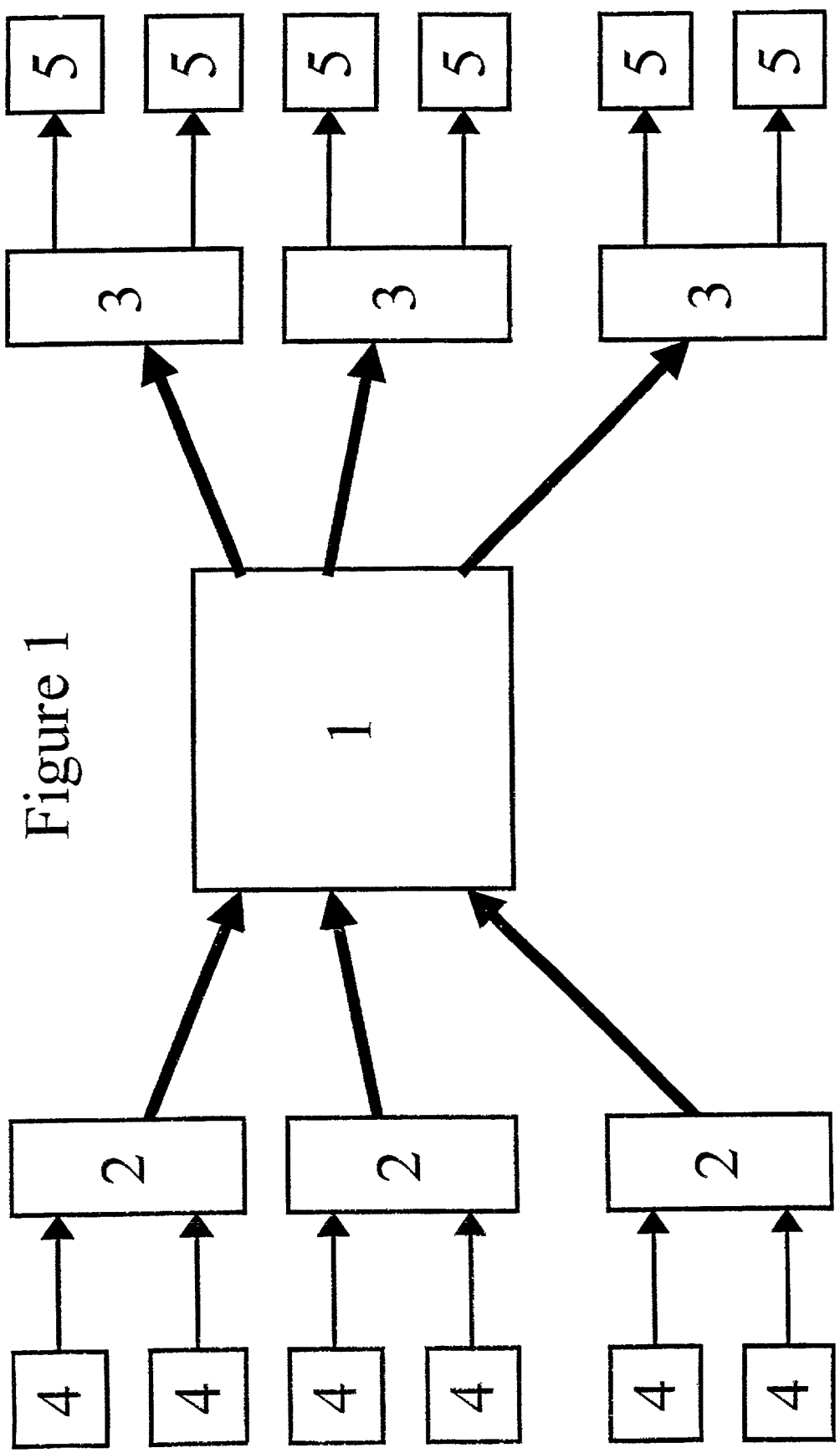
FIG. 1 shows a simplified form of a data switch.

Referring now to FIG. 1, this shows a schematic diagram of a hierarchical switch. The central interconnect 1 provides the cross-connections between a number of high-bandwidth ports. A set of multiplexers 2 on the ingress side and demultiplexers 3 on the egress side provides the aggregation function between the low and high-bandwidth ports. The low bandwidth ports provide connections from the switch to the data sources 4 on the ingress side and the data destinations 5 on the egress side. In practice, a switch is required to support full-duplex ports, so that an ingress multiplexer and its corresponding demultiplexer may be considered a single full-duplex device which will be hereafter termed a "router" Typically the data switch may be of the type disclosed in out co-pending patent application No. PCT/GB99/03748.

It should be noted that the central interconnect 1 may itself be a hierarchical switch, that is the methods described may be applied to switches with an arbitrary number of hierarchical levels.

The aim of these methods is to provide a mechanism whereby the data stream from the switch to a particular destination, which comprises a sequence of cells interleaved from various data sources, may be controlled such that predetermined proportions of its bandwidth are guaranteed to cells from each data source.

Figure 2:
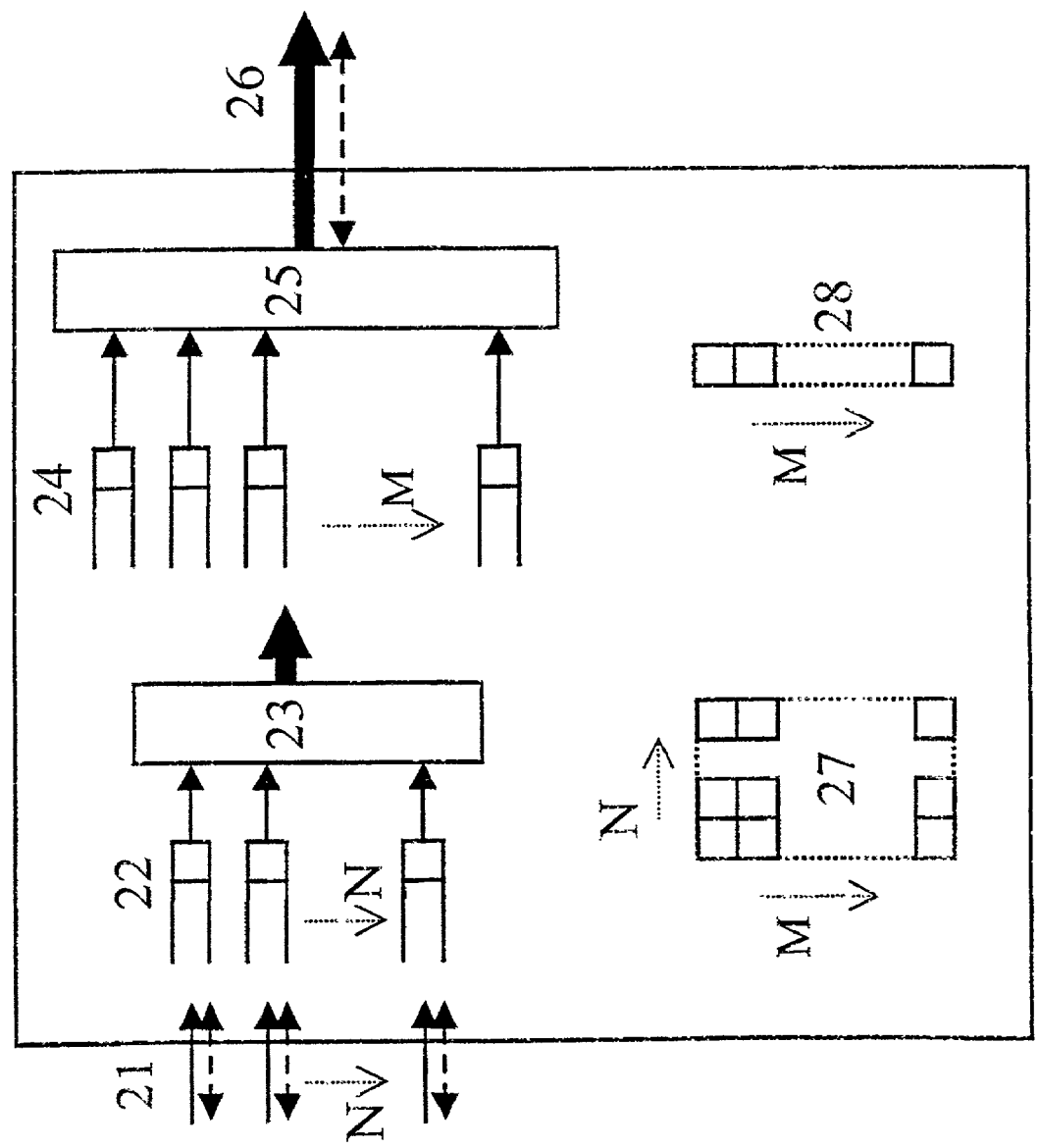
FIG. 2 shows an ingress multiplexer.

FIG. 2 shows the architecture of an ingress multiplexer. An ingress multiplexer receives a set of data streams from the data sources via a set of low-bandwidth input ports. Each data stream is a sequence of equal size cells (that is, an equal number of bits of data). A set of N low-bandwidth ports 21 is provided such that each low-bandwidth port fills one of the N input queues 22. An ingress control unit 23 extracts the destination address from each of the cells in the input queues and transfers them into a set of M virtual output queues 24. There is one virtual output queue for each low-bandwidth output port in the switch. The ingress multiplexer also contains an interconnect link control unit 25 which implements this function by scheduling cells from the virtual output queues 24 across the high-bandwidth link 26 to the central interconnect 1 according to an M-entry egress table 28.

In addition to the data flow indicated by the arrows in FIG. 1, there is also a flow of backpressure or flow-control information associated with each of the data flows. This control flow is indicated in FIG. 2 by dashed arrows. The ingress multiplexer contains an N×M-entry ingress port table 27, which defines how its bandwidth to a particular egress port (via a particular virtual output queue) is distributed across the input ports. This table is used by the ingress control unit 23 to determine when (and to what degree) to exert backpressure to the data source resolved down to an individual virtual output queue.

The ingress multiplexer 2 of FIG. 1 sends control information to the central interconnect I indicating the state of the virtual output queues in the form of "connection requests". The central interconnect responds with a sequence of connections which it will establish between the ingress and egress routers. These are "connection grants". The ingress multiplexer 2 must now allocate the bandwidth to each egress demultiplexer 3 provided by the central interconnect 1 across the virtual output queues associated with each egress demultiplexer.

Figure 3:
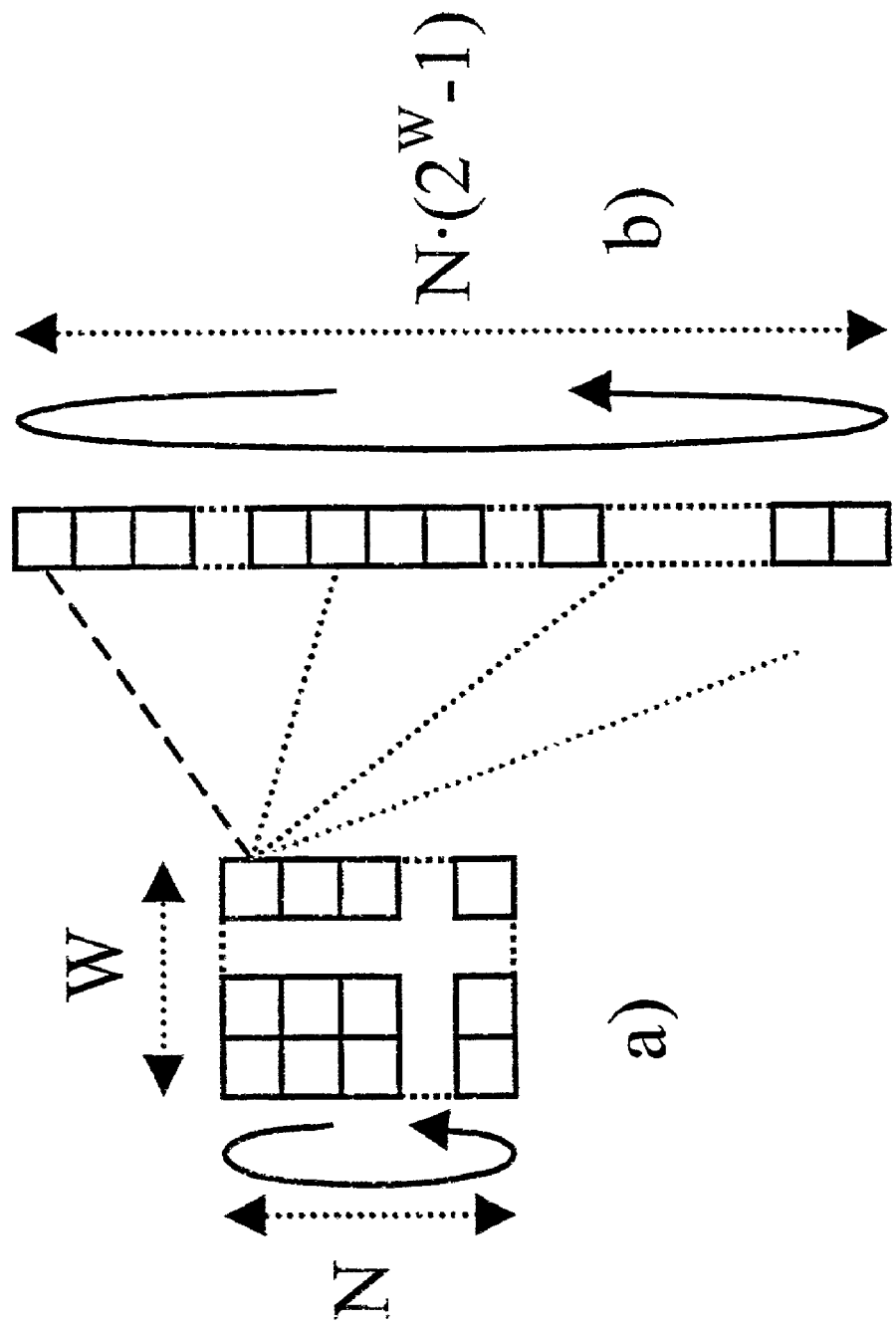
FIG. 3 shows the weighted round robin arbiter for use in the egress multiplexer.

The deterministic scheduling function of the interconnect link control unit 25 may be defined as a weighted round robin (WRR) arbiter. The interconnect link control unit 25 receives a connection grant to a particular egress demultiplexer 3 from the central interconnect 1 and must select one of the N virtual output queues associated with that egress demultiplexer. This may be implemented by expanding the N-way WRR shown in FIG. 3a) into an $(N.(2^w-1))$-way unweighted round robin as shown in FIG. 3b), where W equals the number of bits necessary to define the weight, such that if a queue has a weight of w, then it is represented as $(w-1)$ entries in the unweighted round robin list. For example, with 4-bit weights, a 4-way weighted round robin expands to a 60-way unweighted round robin.

In order to optimize the service intervals to the queues under all weighting conditions, the entries in the unweighted round robin list are distributed such that for each weight the entries are an equal number of steps apart plus or minus one step. Table 1 below shows an example of such an arrangement of 3-bit weights:

| $w_n$ | $e_n$ |
|---|---|
| 1 | 1000000 |
| 2 | 1000100 |
| 3 | 1001010 |
| 4 | 1010101 |
| 5 | 1011011 |
| 6 | 1110111 |
| 7 | 1111111 |

In the system described, the arbiter must select one of the nine queues with 4-bit weights, that is 8 virtual output queues as described above and a multicast queue. This expands to a 135-entry unweighted round robin. The implementation of a large unweighted round robin arbiter may be achieved without resorting to a slow iterative shift-and-test method by the technique of "divide and conquer", that is the 135-entry round robin is segmented into 9 sections of 16-entry round robins, each of which may be implemented efficiently with combinational logic (9×16 provides up to 144 entries, so that the multicast queue of up to 24 entries may actually be allocated more bandwidth than an individual unicast queue of up to 15 entries).

Figure 4:
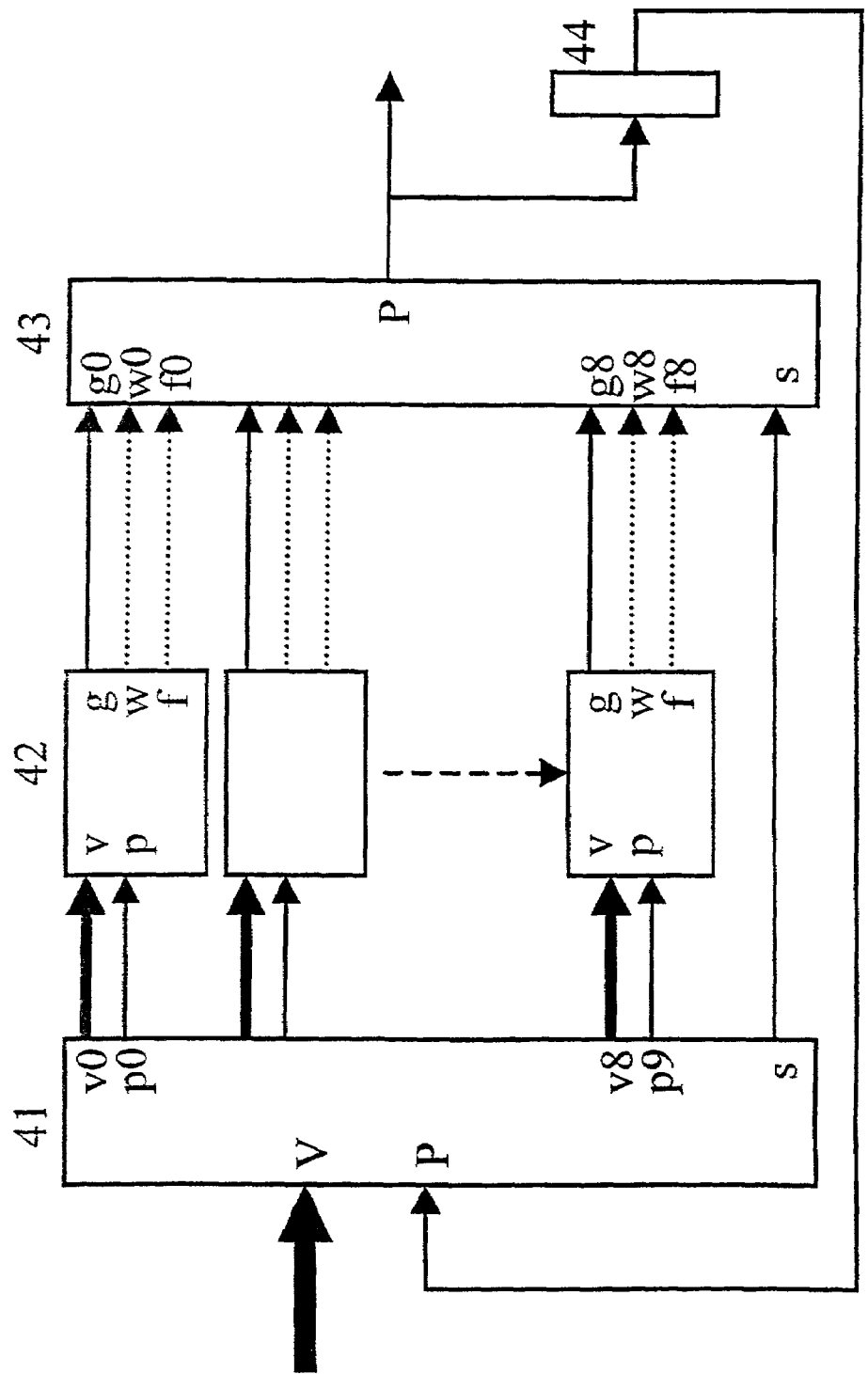
FIG. 4 shows the partitioning of the round robin arbiter.

FIG. 4 illustrates the partitioning of the round robin arbiter. The sorter 41 separates the request vector V (144 bits) into 9 sections of 16-bit vectors, v0 to v8. It also creates nine pointers p0 to p8 for each of the 16-bit round robin blocks 42. The block which corresponds to the existing pointer (which has been saved in register 44) is given a "1" at the corresponding bit location, whilst the other blocks are given dummy pointers initialized to location zero. Each 16-bit round robin block now finds the next "1" in its input vector and outputs its location (g) whether it has to wrap round (w) and whether it has found a "1" in its vector (f). A selector 43 is now able to identify the block which has found the "1" corresponding to the next "1" in the original 135-bit vector given a signal (s) from the sorter 41. This specifies which round robin block had the original pointer position. The selector 43 is itself a round robin function which may be implemented as a combinational logic function "find the next block starting at s which has w=false and f=true (if not found, select s)".

Figure 5:
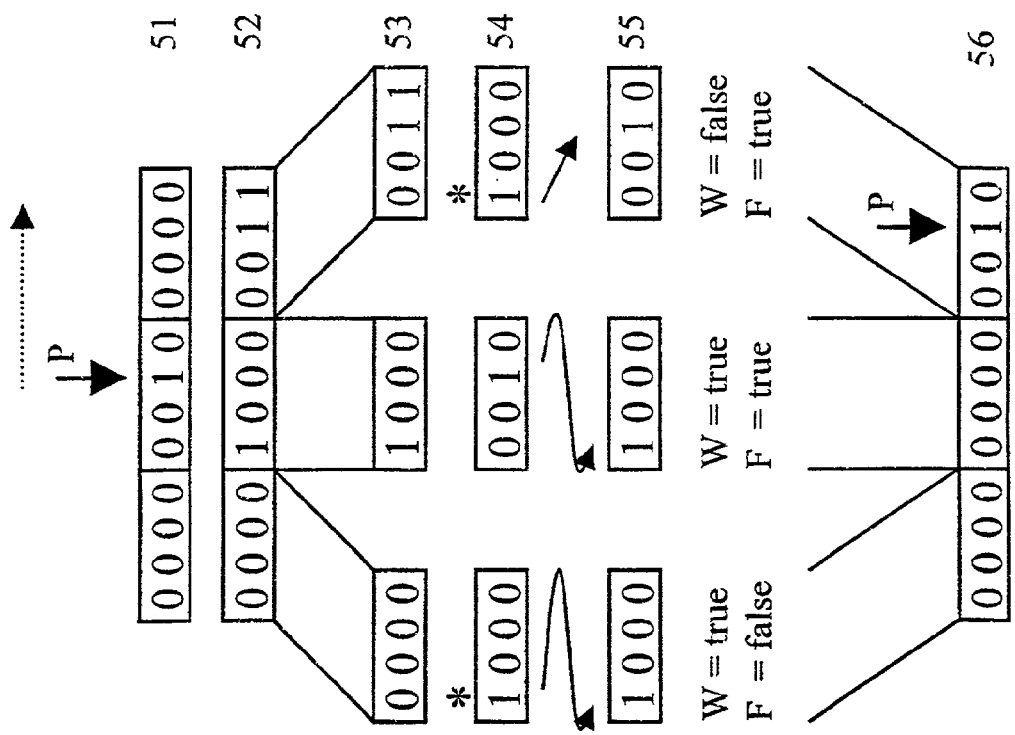
FIG. 5 shows the operation of the round robin arbiter.

FIG. 5 shows an example of the above process, but for a smaller configuration for clarity. In the example, V=12 bits, p=4 bits, v0–2=2 bits and g0–2=2 bits. FIG. 5 depicts the process performed by FIG. 4 and at 51 defines the expanded current pointer (P) and the request vector (V) at 52. The sorter 41 produces segmented vectors (v) and segmented pointers (p) where the blocks marked * are dummies. The segmented results (g) of the round robin are shown at 55 whereas the results of the selector process 43 is shown at 56, defining the expanded next pointer (P).

The central interconnect 1 provides the cross-connect function in the switch. The bandwidth allocation in the central interconnect is defined by an $(M/N)^2$-entry central allocation table, which specifies the weights allocated to each possible connection through the central interconnect (the central interconnect has M/N high-bandwidth ports). The central allocation table contains P2 entries, where P=(M/N). Each entry $w_{ie}$ defines the weights allocated to the connection from high-bandwidth port i to high-bandwidth port e. However, not all combinations of entries constitute a self-consistent set, that is the allocations as seen from the outputs could contradict the allocations as seen from the inputs. A set of allocations is only self-consistent if the sums of weights at each output and input are equal. FIG. 6 shows a self-consistent set (a) and a non-self-consistent set (b) of allocation for a 4-port interconnect with 3-bit weights. Inputs are shown at IP and outputs at OP, with the sum designated as Σ. Assuming that the central allocation table has a self-consistent set of entries, it is possible to define the bandwidth allocation to a link: between input port i and output port a with weight $w_{ie}$ as $p_{ie}$, where:

$$p_{ie} = \frac{w_{ie}}{\sum_{n=0}^{(p-1)} w_{in}}$$

The egress port table defines how the bandwidth of a high-bandwidth port to the central interconnect 1 is allocated across the virtual output queues. There is no issue with self-consistence as all possible entries are self-consistent so that the bandwidth allocation for a virtual output queue v with weight $w_v$ is given by:

$$p_f = \frac{w_v}{\sum_{n=0}^{(N-1)} w_n}$$

Similarly, the ingress port table entries give the bandwidth allocation of a virtual output queue to the ingress ports with weight $w_f$ is given by:

$$p_f = \frac{w_f}{\sum_{n=0}^{(N-1)} w_n}$$

Therefore the proportion of bandwidth at an egress port v allocated to an ingress port f is given by:

$$p_{fv} = p_f p_v \cdot p_{ie}$$

In a switch which is required to maintain strict bandwidth allocation between ports (such as an ATM switch), the tables are set up via a switch management interface from a connection admission and control processor. When the connection admission and control processor has checked that it has the resources available in the switch to satisfy the connection request, then it can modify the ingress port table, the egress port table and the central allocation table to reflect the new distribution of traffic through the switch.

In contrast, a switch may be required to provide a "best effort" service. In this case the table entries are derived from a number of local parameters. Two such parameters are the length Iv of the virtual output queue 1~ and the urgency u, of the virtual output queue. urgency is a parameter which is derived from the headers of the cells entering the queue from the ingress ports.

A switch may be implemented which can satisfy a range of requirements (including the two above) by defining a weighting function which "mixes" a number of scheduling parameters to generate the table entries in real time according to a set of "sensitivities" to length, urgency and pseudo-static bandwidth allocation. ($s_l$, sw, ss). The requirement on the function are that it should be fast and efficient, since multiple instances occur in the critical path of a switch. In the system described the weighting function has the form:

$$w_v = \left\{ \frac{1_v^2}{2^{(1/sl)}} + \frac{p_v}{2^{(1/ss)}} + \frac{u_v}{2^{(1/su)}} \right\} \cdot (1 - b_v)$$

where $b_v$ is the backpressure applied from the egress multiplexer, $w_v$ is the weight of the queue as applied to the scheduler, and $p_v$ is a pseudo-static bandwidth allocation, such as an egress port table.

Despite the apparent complexity of this function, it may be implemented exclusively with an adder, multiplexers and small lookup tables, thus meeting the requirement for speed and efficiency. Features of this weighting function are that, for $s_l$=1.0, $s_s$=0.0 and $s_u$=0.0, bandwidth is allocated locally purely on the basis of queue length, ith a non-linear function, so that the switch always attempts to avoid queues overflowing. When $s_l$=0.0, $s_s$=1.0 and $s_u$=0.0, bandwidth is allocated purely on the basis of pseudo-static allocations as described above. Finally, when $s_l$=0.0, $s_s$=1.0 and $s_u$=0.5, bandwidth is allocated on the basis of pseudo-static allocation but a data source is allowed to "push" some data harder, when the demand arises, by setting the urgency bit in the appropriate cell headers.

Figure 7:
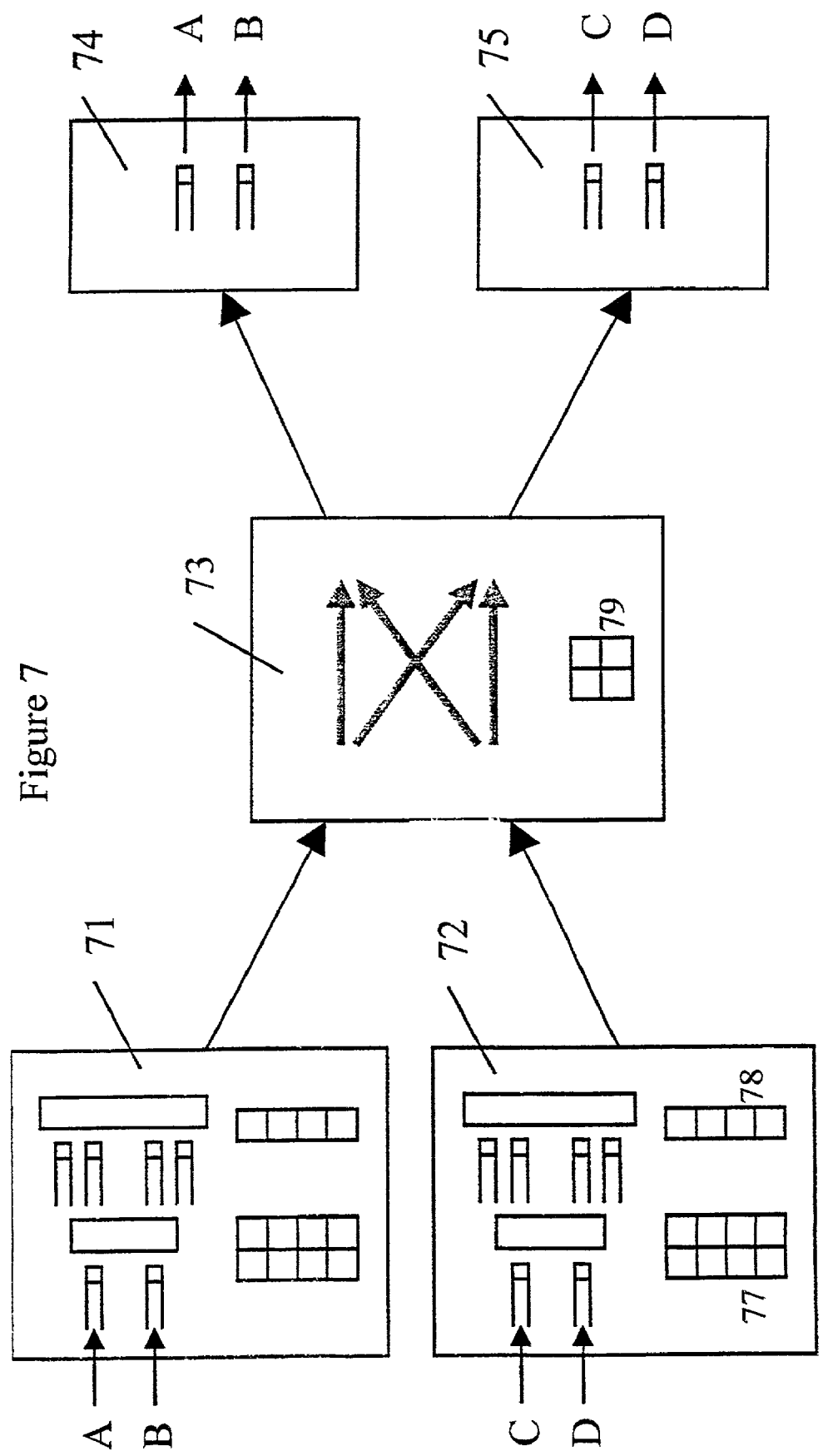
FIG. 7 shows a block diagram of a small switch based on the principles of the invention.

FIG. 7 is a block diagram of a small switch based on the above principles, showing the correct number of queues, tables and table entries. In FIG. 7 there are two ingress routers 71 and 72, a central cross-bar switch 73 and two egress routers 74 and 75. Each ingress router has two low-bandwidth input ports, A and B for router 71 and ports C and D for router 72. As mentioned previously, each ingress router has an ingress port table such as 77 for router 72 and an egress port table such as 78, whereby the central switch 73 has a central allocation table 79. Assuming that each low-bandwidth port may transport 1 Gbps of traffic, each high-bandwidth link may carry 2 Gbps and the switch is required to guarantee the following bandwidth allocations:

| Flow bandwidth | Destination Port | | | |
|---|---|---|---|---|
| (Gbps) | A | B | C | D |
| A | 0.5 | 0.1 | 0.1 | 0.2 |
| B | 0.2 | 0.2 | 0.2 | 0.2 |
| C | — | 0.5 | — | 0.2 |
| D | 0.1 | 0.1 | 0.6 | 0.2 | then the ingress port table such as 77, egress port table such as 78 and central allocation table 79 would be set up by the connection admission and control processor with the following 4-bit values (note here that there will be rounding errors due to the limited resolution of the 4-bit weights):

| Ingress Port Table (in router 71) | | |
|---|---|---|
| | Source | |
| | A | B |
| A | 15 | 6 |
| B | 3 | 6 |
| C | 3 | 6 |
| D | 6 | 6 |

| Ingress Port Table (in router 71) | |
|---|---|
| | Source AB |
| A | 14 |
| B | 6 |
| C | 6 |
| D | 8 |

| Ingress Port Table (in router 72) | | |
|---|---|---|
| | Source | |
| | C | D |
| A | 0 | 3 |
| B | 15 | 3 |
| C | 0 | 13 |
| D | 6 | 5 |

| Ingress Port Table (in router 72) | |
|---|---|
| | Source CD |
| A | 2 |
| B | 12 |
| C | 12 |
| D | 8 |

-continued

Central Allocation Table

| Source | Destination Router | |
|---|---|---|
| | AB | CB |
| AB | 15 | 10 |
| CD | 10 | 15 |

The invention claimed is:

1. A method of scheduling the passage of data cells from N low-bandwidth data sources to M low-bandwidth data destinations in a data switching apparatus including ingress and egress multiplexers, N being the number of low-bandwidth data sources associated with each ingress multiplexer, in which the data switching apparatus includes:
M/N ingress multiplexers, each arranged to receive data cells from a respective set of N said low-bandwidth data sources,
M/N egress multiplexers, each arranged to transmit data cells to a respective set of N said low-bandwidth data destinations,
a master control unit, and
a central switch having M/N high-bandwidth input ports arranged to receive data cells from respective said ingress multiplexers, and M/N high-bandwidth output ports arranged to transmit data cells to respective said egress multiplexers, the central switch selectively interconnecting the input ports and output ports, under the direction of the master control unit,
the method comprising the steps of:
maintaining N input queues in each of said ingress multiplexers for queuing data cells received from the N respective said data sources, and maintaining M virtual output queues for queuing data cells directed to respective said data destinations;
maintaining a respective ingress port table in each of said ingress multiplexers, each ingress port table having N×M entries, each entry corresponding to a respective combination of a said data source for that ingress port and a said data destination,
transferring data cells from said input queues to said virtual output queues by each of said ingress multiplexers with a relative frequency according to a value of the corresponding entry of the ingress port table;
maintaining a respective egress port table in each of said ingress multiplexers, the egress port table, having M entries, each entry corresponding to a respective said data destination,
transferring data cells from said virtual output queues to said respective input ports of the central switch by each of said ingress multiplexers with a relative frequency according to the value of the corresponding entry of the egress port table;
maintaining a central allocation table in the master control unit having $(M/N)^2$ entries, each corresponding to a respective combination of an input port and an output port, and
controlling the central switch by the master control unit to interconnect pairs of said input ports and output ports with a relative frequency according to the value of the corresponding entry of the central allocation table;
whereby said ingress port tables, egress port tables and central allocation table together determine the bandwidth through the digital data switching apparatus from each said data source to each said data destination.

2. The method according to claim 1 wherein each said ingress multiplexer, for each virtual output queue, transfers data cells to that virtual output queue from said input queues in accordance with a N-way weighted round robin, using N weights determined respectively by the N entries of the ingress port table for that virtual output queue.

3. The method according to claim 2, wherein each weight is defined by a number of bits w, and the N-way weighted round robin for each virtual output queue is implemented by an $N(2^w-1)$-way unweighted round robin using a request vector list constructed by interleaving N words of $(2^w-1)$ bits each, each word corresponding to a respective input queue and having a number of "1"s determined by the entry of the ingress port table for that input queue and that virtual output queue.

4. The method according to claim 3, wherein the request vector list is separated into a plurality of round robin blocks, each corresponding to a respective input queue, a first round robin process being performed independently within each block, and a second round robin process being performed to make a selection among the blocks.

5. The method according to claim 1, wherein the ingress port table, the egress port table and the central allocation table are all programmed from an external source.

6. The method according to claim 5, wherein the external source uses parameters characterizing the length of each virtual output queue and the urgency of each virtual output queue.

7. The method according to claim 6, wherein the external source uses a set of sensitivities relating to length, urgency and pseudo-static bandwidth allocation.

8. A digital data switching apparatus for transmitting data from N low-bandwidth data sources to M low-bandwidth data destinations, the digital data switching apparatus including ingress multiplexers and egress multiplexers, N being the number of low-bandwidth data sources associated with each ingress multiplexers, in which the data switching apparatus includes:
M/N ingress multiplexers for receiving data cells from respective sets of N said low-bandwidth data sources,
M/N egress multiplexers for transmitting data cells to respective sets of N said low-bandwidth data destinations,
a master control unit,
a central switch having M/N high-bandwidth input ports arranged to receive data cells from respective said ingress multiplexers, and M/N high-bandwidth output ports arranged to transmit data cells to respective said egress multiplexers, the central switch being arranged selectively to interconnect the input ports and output ports, under the direction of the master control unit,
each said ingress multiplexer being arranged to maintain N input queues for queuing data cells received from respective said data sources, and to maintain M virtual output queues for queuing data cells directed to respective said data destination;
wherein each ingress multiplexer is arranged to maintain a respective ingress port table, each ingress port table having N×M entries, each entry corresponding to a respective combination of a said data source and a said data destination, and each ingress multiplexer is arranged to transfer data cells from said input queues to said virtual output queues with a relative frequency according to value of the corresponding entry of the ingress port table;

each ingress multiplexer is arranged to maintain a respective egress ort table, the egress port table having M entries, each corresponding to a respective said data destination, and each ingress multiplexer is arranged to transfer data cells from said virtual output queues to said respective input ports of the central switch with a relative frequency according to value of the corresponding entry of the egress port table, and the master control unit is arranged to maintain a central allocation table having $(M/N)^2$ entries, each corresponding to a respective combination of an input port and an output port, and the master control unit controls the central switch to interconnect pairs of said input ports and output ports with a relative frequency according to the value of the corresponding entry of the central allocation table;

whereby said ingress port tables, egress port tables and central allocation table together determine the bandwidth through the digital data switching apparatus from each said data source to each said data destination.

9. The apparatus according to claim 8, wherein each said ingress multiplexer is arranged, for each virtual output queue, to transfer data cells to that virtual output queue from said input queues in accordance with a N-way weighted round robin, using N weights determined respectively by the N entries of the ingress port table for that virtual output queue.

10. The apparatus according to claim 8, wherein each weight has a number of bits w, and the N-way weighted round robin for each virtual output queue is implemented by an $N(2^w-1)$-way unweighted round robin using a request vector list constructed by interleaving N words of $(2^w-1)$ bits each, each word corresponding to a respective input queue and having a number of "1"s determined by the entry of the ingress port table for that input queue and that virtual output queue.

11. The apparatus according to claim 10, wherein the request vector list is separated into a plurality of round robin blocks, each corresponding to a respective input queue, each ingress multiplexer being arranged to perform a first round robin process independently within each block, and a second round robin process to make a selection among the blocks.

12. The apparatus according to claim 8, further comprising an external source unit arranged to program the ingress port table, the egress port table and the central allocation table.

13. The apparatus according to claim 12, wherein the external source unit is arranged to operate using parameters characterizing the length of the virtual output queue and the urgency of the virtual output queue.

14. The apparatus according to claim 13, wherein the external source unit is arranged to operate using a set of sensitivities relating to the length, urgency and pseudo-static bandwidth allocation.

* * * * *